Sept. 9, 1924.  F. K. LANDGRAF  1,507,840
METHOD OF PROVIDING METAL PACKING BETWEEN TWO MEMBERS
Filed Feb. 10, 1920
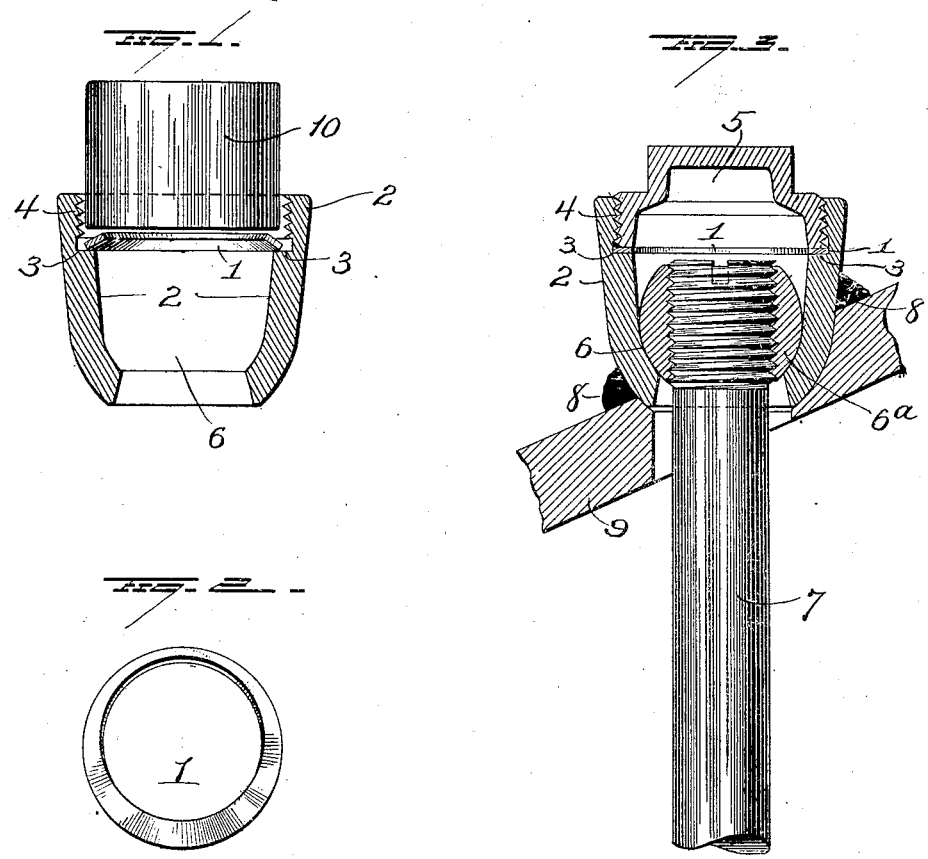

Patented Sept. 9, 1924.

1,507,840

UNITED STATES PATENT OFFICE.

FREDERICK K. LANDGRAF, OF PITTSBURGH, PENNSYLVANIA, ASSIGNOR, BY MESNE ASSIGNMENTS, TO FLANNERY BOLT COMPANY, OF PITTSBURGH, PENNSYLVANIA, A CORPORATION OF DELAWARE.

METHOD OF PROVIDING METAL PACKING BETWEEN TWO MEMBERS.

Application filed February 10, 1920. Serial No. 357,594.

*To all whom it may concern:*

Be it known that I, FREDERICK K. LANDGRAF, a citizen of the United States, and a resident of Pittsburgh, in the county of Allegheny and State of Pennsylvania, have invented certain new and useful Improvements in Methods of Providing Metal Packing Between Two Members; and I do hereby declare the following to be a full, clear, and exact description of the invention, such as will enable others skilled in the art to which it appertains to make and use the same.

This invention relates to improvements in methods of providing metal packing between two members and more particularly to the manner of providing a gasket in a bearing sleeve for a bolt head, to serve as a packing for a closure,—the object of the invention being to so form and apply the gasket that it shall rest upon the entire surface of the shoulder in the bearing sleeve and be held firmly in place and so that it will afford a bearing for the inner end portion of a hollow closure, throughout the full extent of said inner end portion, and thus insure a tight and efficient joint between the closure and the sleeve to prevent possibility of leakage.

With this and other objects in view, the invention consists in certain novel features as hereinafter set forth and pointed out in the claim.

In the accompanying drawings; Figure 1 is a sectional view showing the manner of applying the gasket to the bearing sleeve; Figure 2 is a separate view of the gasket, and Figure 3 is a view showing an assembled staybolt structure with the gasket in place.

When a gasket for use between the inner end of a closure and a shoulder in the bearing sleeve is made flat, it merely rests against said shoulder and is liable to become displaced when the closure is removed. Furthermore, a flat gasket must have an external diameter sufficiently less than the internal diameter of the threaded portion of the sleeve to permit said gasket to be placed against the shoulder in the sleeve, and this necessitates the use of a closure having its annular inner end portion made narrow and if the shoulder within the sleeve is not also narrow, the gasket will not extend to the wall of the sleeve at all portions of its circumference.

In order that the gasket shall be securely held in place on the shoulder within the bearing sleeve and at the same time afford an efficient packing between the inner end of the closure and the sleeve so as to obviate possibility of leakage, I employ a gasket made of annealed metal, and I so form the gasket that its wall shall be inclined. In other words, the gasket has a taper so that it shall form a transverse sectional portion of a hollow cone. A gasket 1 thus constructed is inserted into the outer end portion of a bearing sleeve 2 so as to rest against an annular shoulder 3 within said sleeve,— a portion of the inner wall of the sleeve between the outer end thereof and the shoulder 3 being threaded, as at 4, to receive a hollow, exteriorly threaded closure 5. The bearing sleeve is formed with a partly spherical interior seat 6 for the rounded head 6ᵃ of a staybolt 7, and the sleeve may be rounded externally and secured by a weld 8 to a boiler sheet 9 coincident with the bolt opening in the latter.

After the tapering gasket 1 shall have been inserted into the bearing sleeve and caused to rest against the shoulder 3 therein so that the portion thereof having the greatest diameter will rest upon the shoulder 3 as shown in figure 1, a suitable tool 10 will be inserted into the sleeve, whereby pressure may be applied to the gasket (with the use of a hammer or other suitable means); so as to flatten the same and cause its outer peripheral edge to extend to, or (if desired) bind firmly against the wall of the sleeve adjacent to the shoulder 3 and be approximately in line with the base of the threads of the internally threaded portion 4. The gasket is thus caused to completely cover the shoulder 3 and to become securely placed within the sleeve, so that when the closure 5 is subsequently inserted, and accurately placed, an adequate packing will be provided for its inner end portion thus insuring a steam-tight joint, and so that when the closure is removed, displacement of the gasket will be prevented.

I do not in this application claim the mechanical structure herein shown and described, the same being covered by my copending application Serial No. 436,473.

Having fully described my invention what I claim as new and desire to secure by Letters-Patent, is:—

The herein described method of providing a metal packing between two members, one of which has an internally threaded part to receive an externally threaded part of the other member, consisting in placing upon a shoulder at the end of the internally threaded portion a pliable metal gasket having a shape corresponding to a cross section of a hollow cone, flattening said gasket on said shoulder under pressure and simultaneously expanding it and causing it to cover said shoulder and extend beyond the free edge of the threads of said internally threaded member.

In testimony whereof, I have signed this specification in the presence of two subscribing witnesses.

FREDERICK K. LANDGRAF.

Witnesses:
 HOWARD O. CAPPEL,
 B. E. D. GRAFFONT.